United States Patent [19]  
Martinez et al.

[11] 4,439,587  
[45] Mar. 27, 1984

[54] WATER DISPERSIBLE ACRYLIC MODIFIED CHLORINATED RUBBER

[75] Inventors: Carlos J. Martinez, Edison; Albert C. Chen, E. Brunswick, both of N.J.

[73] Assignee: Mobil Oil Corporation, New York, N.Y.

[21] Appl. No.: 355,434

[22] Filed: Mar. 8, 1982

[51] Int. Cl.³ ............................................ C08F 259/02
[52] U.S. Cl. ..................................... 525/292; 428/462; 428/492; 428/530; 524/457; 525/66; 525/301; 525/302; 525/310
[58] Field of Search ................ 525/301, 302, 310, 292

[56] References Cited

U.S. PATENT DOCUMENTS 3,037,948  6/1962  Landler et al. ..................... 525/68
4,285,847  8/1981  Ting ................................... 260/29.2

Primary Examiner—J. Ziegler
Attorney, Agent, or Firm—Alexander J. McKillop; Michael G. Gilman; Edward J. Trojnar

[57] ABSTRACT

This invention provides a graft copolymer of at least one acrylic monomer and chlorinated natural or synthetic rubber, in which at least about 8 percent of the total weight of said graft copolymer is derived from acrylic acid, methacrylic acid, or both. It also provides aqueous dispersions of such graft copolymers and coating compositions containing them.

3 Claims, No Drawings

WATER DISPERSIBLE ACRYLIC MODIFIED CHLORINATED RUBBER

BACKGROUND OF THE INVENTION

1. Field of the Invention

This invention is concerned with acrylic modified chlorinated rubber.

2. Description of the Prior Art

Insofar as is now known, the polymers of this invention has not been proposed.

SUMMARY OF THE INVENTION

This invention provides a graft copolymer of at least one acrylic monomer and chlorinated rubber in which at least about 8 percent of the total weight of said graft copolymer is derived from acrylic acid, methacrylic acid, or both. It also provides anionic aqueous dispersions of such graft copolymers and coating compositions containing them.

DESCRIPTION OF SPECIFIC EMBODIMENTS

The main backbone of the graft copolymers of this invention is chlorinated natural or synthetic rubber. Chlorinated rubber is well known in the art and is widely available commercially. Synthetic rubbers that can be chlorinated include SBR, butyl rubber, Buna S, Buna N, and Neoprene. Generally the rubbers are chlorinated to about 64-67 weight percent.

The random copolymer is grafted with at least one acrylic monomer. Various acrylic monomers and monomers copolymerizable therewith can be used. In order to provide sufficient free carboxyl groups to render the graft copolymer water dispersible, however, at least about 8 percent of its weight must be acrylic acid or methacrylic acid moieties. The acrylic monomers can all be acrylic acid or methacrylic acid or it can be a mixture of acrylic monomers or of acrylic monomers and other monomers polymerizable therewith, provided that sufficient acrylic or methacrylic acid is used to amount to at least about 8 percent of the total weight of the graft copolymer. Non-limiting examples of utilizable acrylic monomers are acrylic acid, methacrylic acid, methyl acrylate, methyl methacrylate, ethyl acrylate, ethyl methacrylate, propyl acrylate, propyl methacrylate, butyl acrylate, butyl methacrylate, hydroxyethyl acrylate, hydroxyethyl methacrylate, hydroxypropyl methacrylate, acrylonitrile, methacrylonitrile, acrylamide, methacrylamide, and monomers copolymerizable therewith, such as styrene, p-methylstyrene, and lower monoolefins.

The graft copolymerization can be carried out by polymerizing the acrylic monomer or monomers in a solution of the chlorinated rubber backbone resin under free radical conditions.

The graft copolymerization is carried out by any of the means well known in the art. Typically, the chlorinated rubber is dissolved in a suitable solvent, such as methyl ethyl ketone, methoxyethanol, methoxypropanol, ethoxyethanol, aromatic hydrocarbons, chlorinated hydrocarbons, and the like. The copolymerization can be carried out under free radical conditions using a suitably free radical initiator, such as t-butyl perbenzoate or benzoyl peroxide. The temperature used is the activation temperature of the catalyst.

In forming a coating composition containing the acidic graft copolymer resin, the resin is neutralized with a tertiary amine, ammonia, or ammonium hydroxide to a pH about 7.0 to about 9.0. Typical amines utilizable include triethylamine, tripropylamine, dimethylethanolamine, diethylethanolamine, dimethylethylamine, and methyldiethylamine.

In the finished coating composition, the resin solids content will be about 10 to about 40 weight percent. The volatile system (including amine, ammonia, or ammonium hydroxide) will be between about 90 weight percent and about 60 weight percent of the finished coating composition, preferably about 75-85 weight percent. About 65 to 90 weight percent of the volatile system will be water and the balance (35 to 10 weight percent) will be organic volatile solvents, including amine, ammonia, or ammonium hydroxide. Preferably, the ratio of water to organic volatiles will be about 70:30 to 80:20 in the volatile system. Each component of the solvent system will be present in between about one weight percent and about 20 weight percent of the weight of the final composition. A typical and preferred solvent system is defined in the working examples.

The coating composition may contain a cross-linking agent, such as an aminoplast. The preferred material used to thermoset the coating, if one is used, is conventional aminoplast cross-linking agent. Such agents are well known in the art. There may be used any of the thermosetting alkylated amionplast resins, such as the urea-aldehyde resins, the malamine-aldehyde resins, the dicyandiamide-aldehyde resins and other aminoplast-aldehyde resins such as those triazine resins produced by the reaction of an aldehyde with formoguanamine, ammeline, 2-chloro-4, 6-diamino-1,3,5-triazine, 2-phenyl-p-oxy-4,6-diamino-1,3,5-triazine, 6-methyl-2,-4-diamino-1,3,5-triazine; 2,4,6-trihydrazine-1,3,5-triazine, and 2,4,6-triethyltriamino-1,3,5-triazine. The mono-, di-, or triaralkyl or mono, di-, or triaryl melamines, for instance, 2,4,6-triphenyltriamino-1,3,5-triazine can be used. Also utilizable are benzoguanamine and hexamethoxymethylmelamine. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like. It is preferred to use an aminoplast that is water soluble. The film forming polymer could be used in an air-dry lacquer type system. For improved water resistance, however, an aminoplast cross-linking agent can be used in some cases. The amount of cross-linking agent used is generally between about 15 weight percent and about 40 weight percent, based on total resin solids.

The coating composition of this invention is primarily useful for coating aluminum, tin plated steel, pretreated metals, steel, and metals coated with the same or different resin composition (i.e., a second coat). The coating composition can be used, however, for coating other substrates such as wood, paper, masonry, and leather. The most preferred and useful use of the coating composition is for coating of cans, coil stock, and fabricated metal. Coating can be done by any coating procedure well known to those skilled in the art including direct roll-coating, electrodeposition, spraying, flow coating and the like. After coating the substrate, the coating can be forced dry by heating for about one minute to about 30 minutes between about 32° C. and about 121° C. (90°-250° F.).

EXAMPLE

A solution was prepared by dissolving 150.0 g. chlorinated rubber (Alloprene X-5) in 75.0 g. methoxypropanol and 75.0 g. methyl isobutyl ketone. The solution was charged to reactor equipped with an agitator, reflux condenser, thermometer, addition funnel, and nitrogen inlet. A premix of 37.5 g. methacrylic acid, 112.5 g. isobutyl methacrylate, and 3.0 g. benzoyl peroxide was placed in the addition funnel. Nitrogen flow was started and the solution in the reactor was heated to about 100° C. This temperature was maintained during the addition of the monomer premix at a rate of about 50 drops per minute (2–3 hrs.). A 0.6 g. portion of t-butyl peroxy isopropyl carbonate was then added and the reactor temperature was maintained at 100° C. for about half an hour. Another 0.6 g. t-butyl peroxy isopropyl carbonate was added and the temperature maintained another half an hour.

The reactor contents were then cooled to 70°–80° C. and 38.7 g. dimethyl ethanolamine in 150.0 g. deionized water was added dropwise to the reactor to disperse the resin. An additional 150.0 g. deionized water then added to dilute the resin dispersion.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A graft copolymer of at least one acrylic monomer or of at least one acrylic monomer and other monomers copolymerizable therewith, and chlorinated natural rubber or chlorinated synthetic rubber, in which at least about 8 percent of the total weight of said graft copolymer is derived from acrylic acid, methacrylic acid, or both.

2. The graft copolymer of claim 1, wherein said rubber is natural rubber chlorinated to about 65 percent.

3. The graft copolymer of claim 1, wherein said monomers comprise methacrylic acid and isobutyl methacrylate.

* * * * *